Aug. 6, 1946.   R. E. J. NORDQUIST   2,405,232
LIQUID FILLING MACHINE
Filed Sept. 7, 1940     10 Sheets-Sheet 8

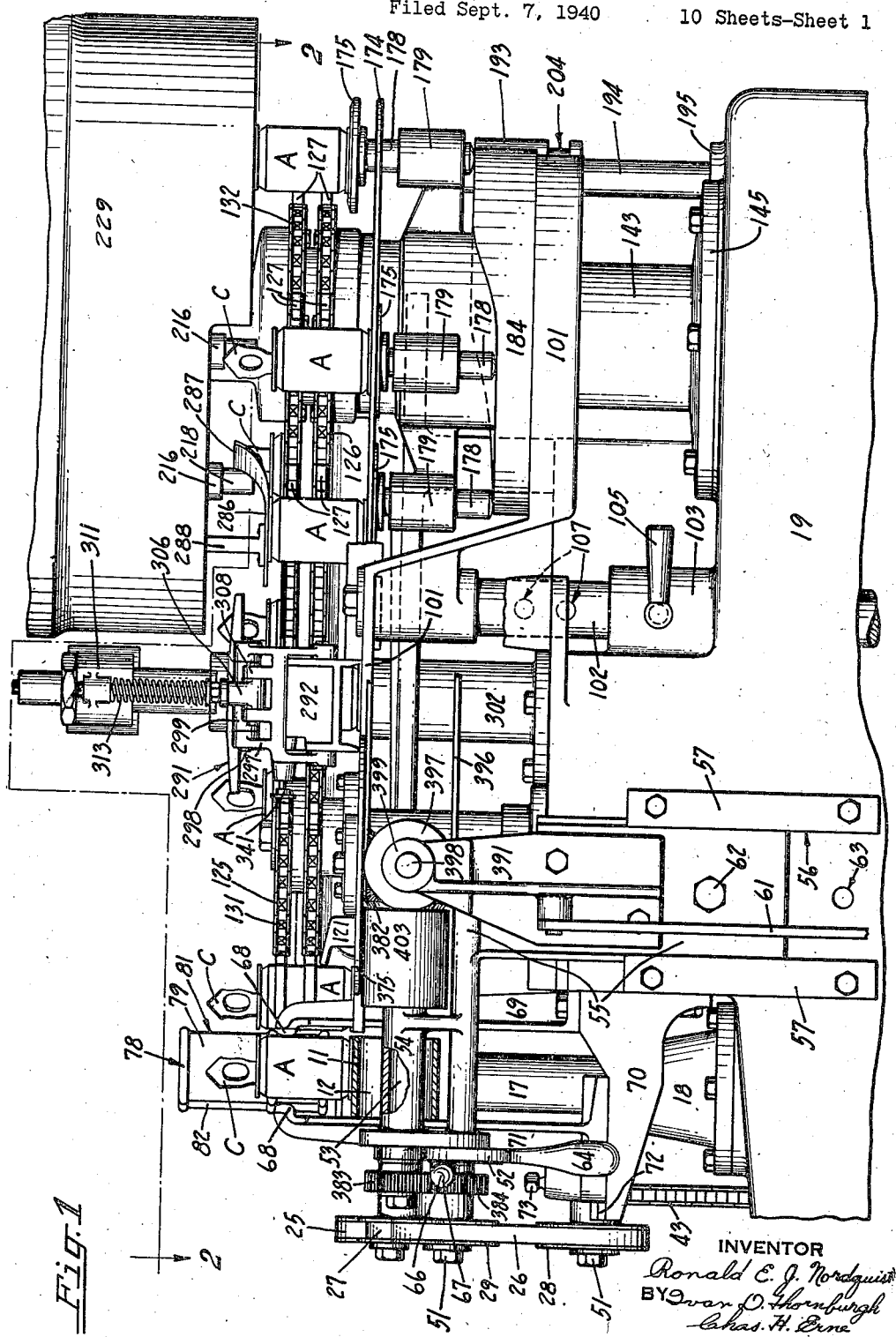

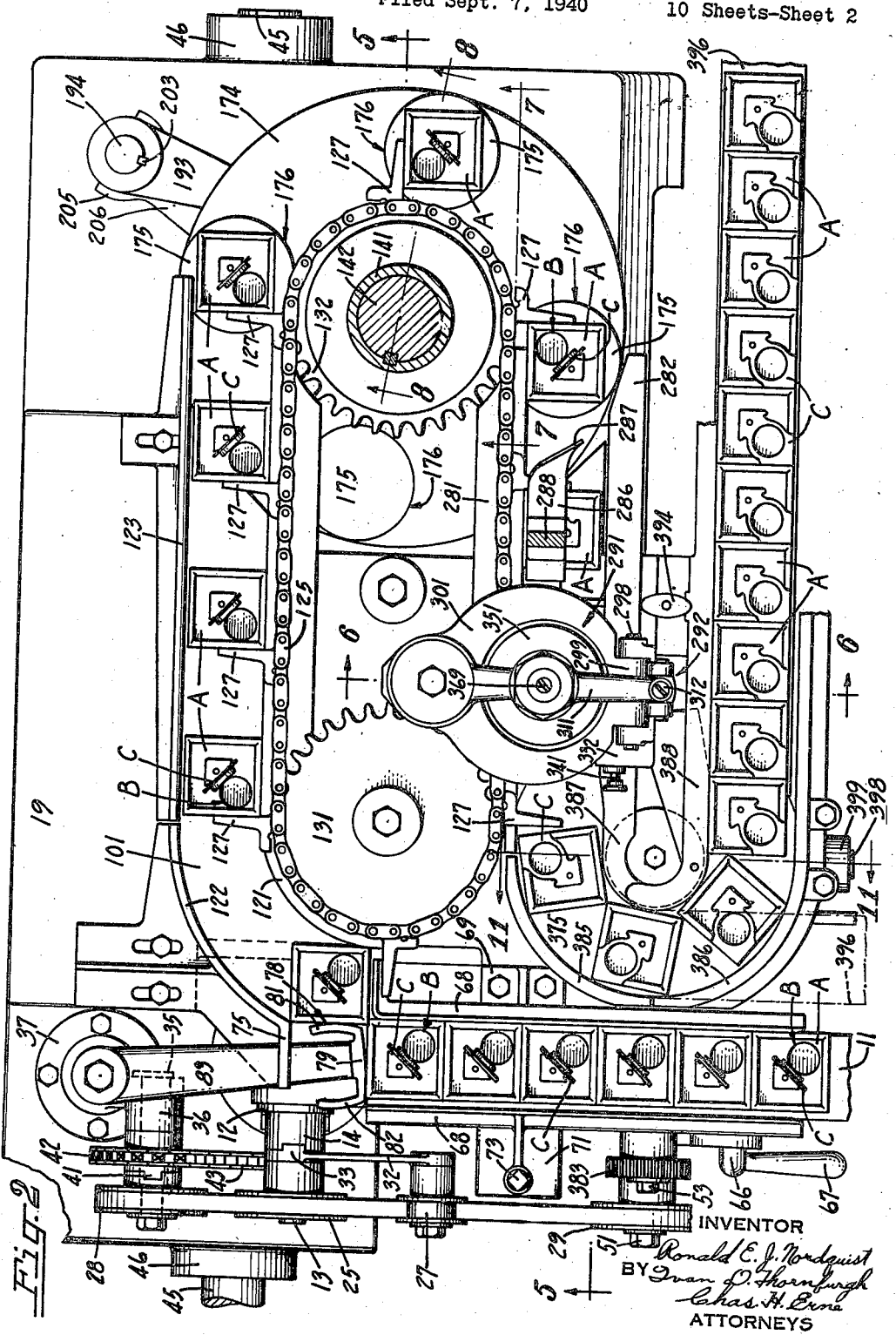

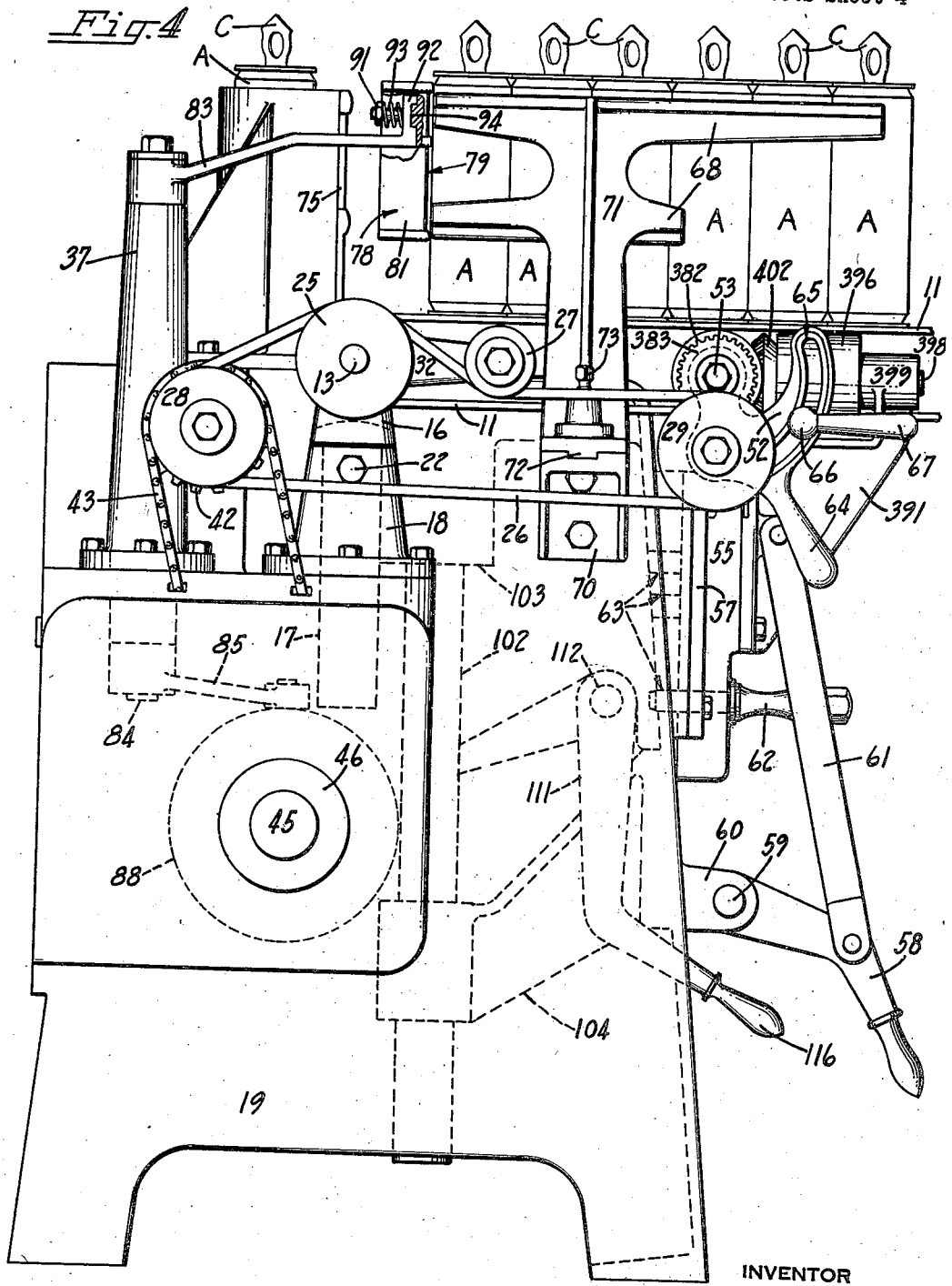

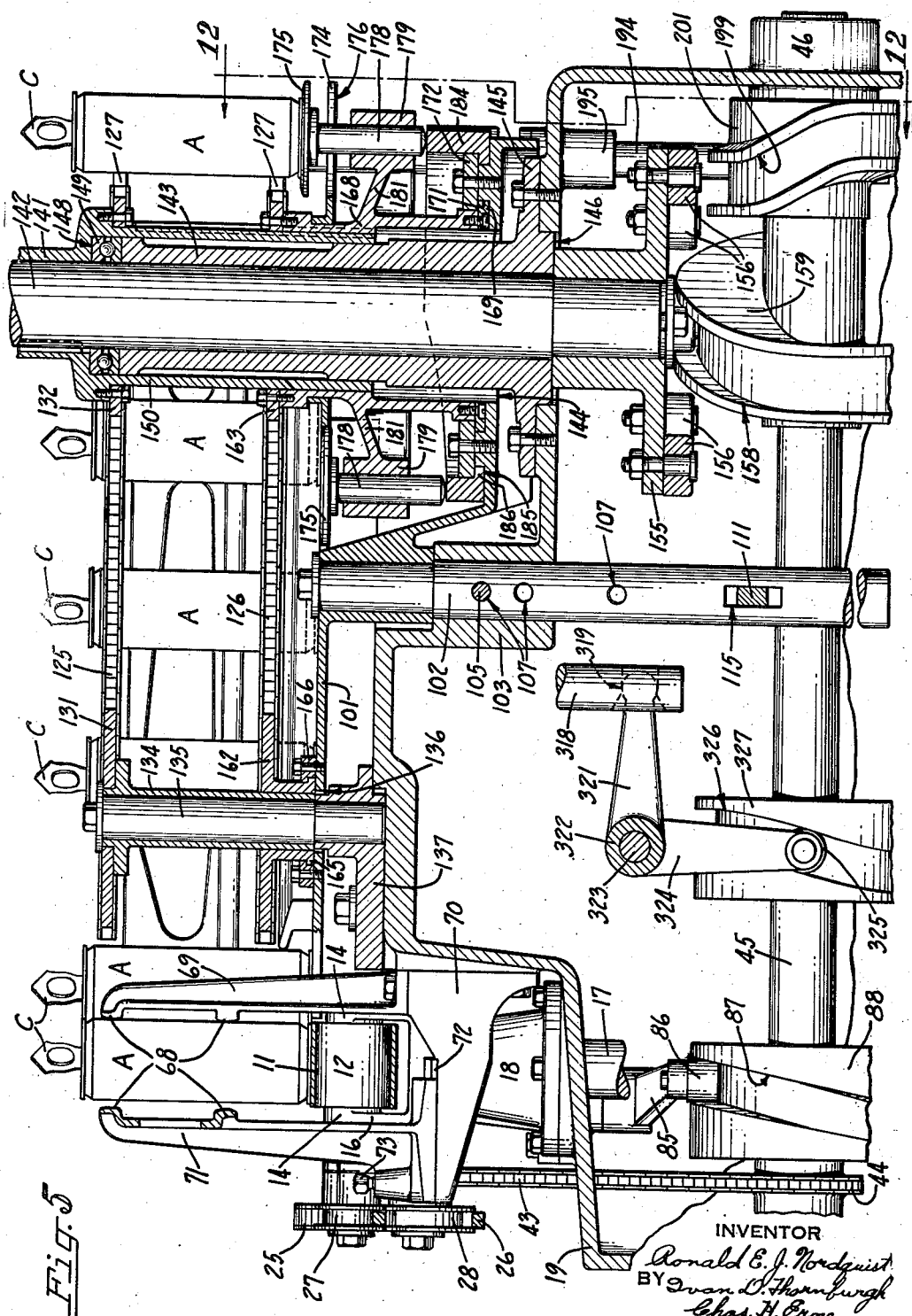

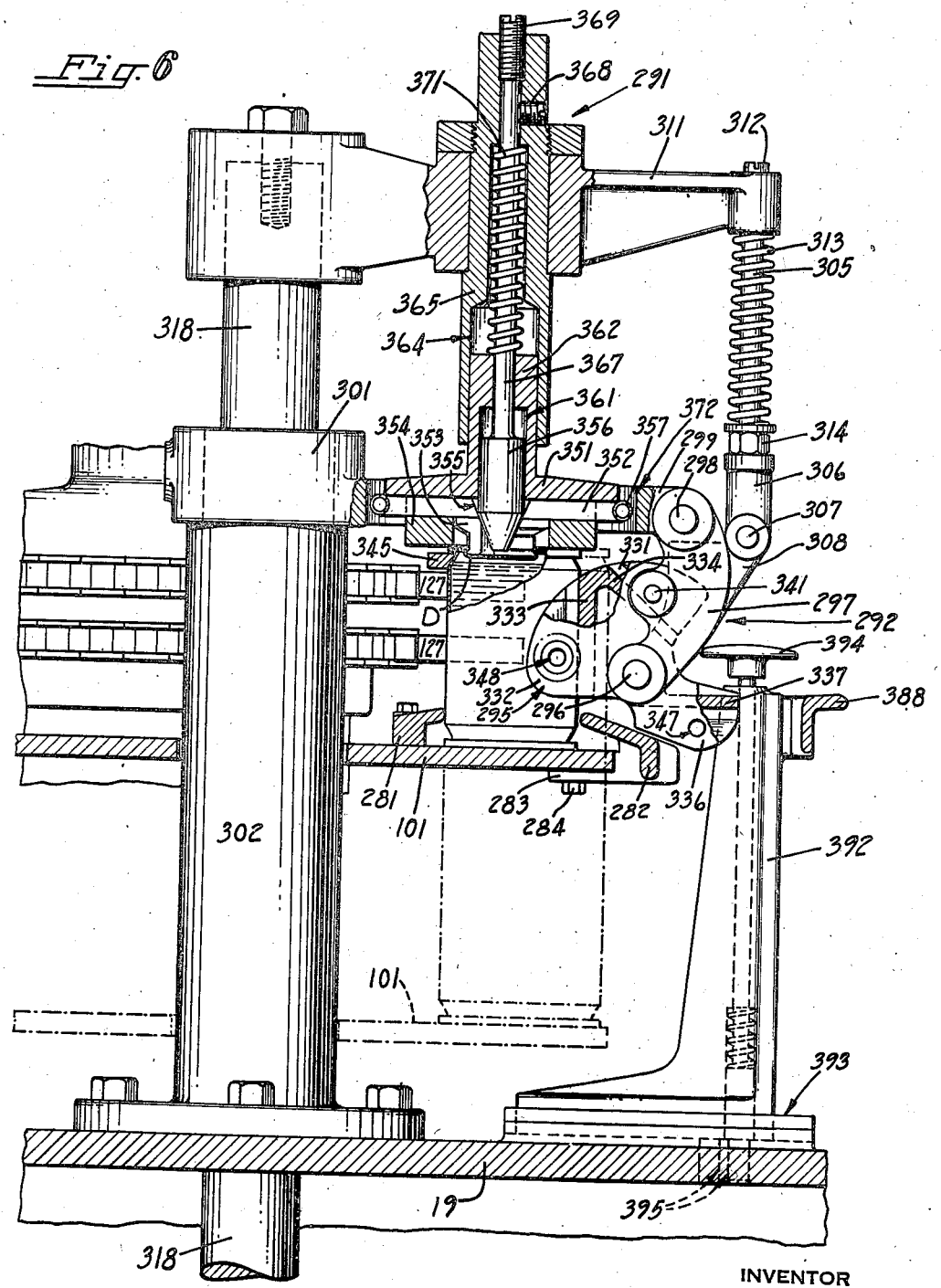

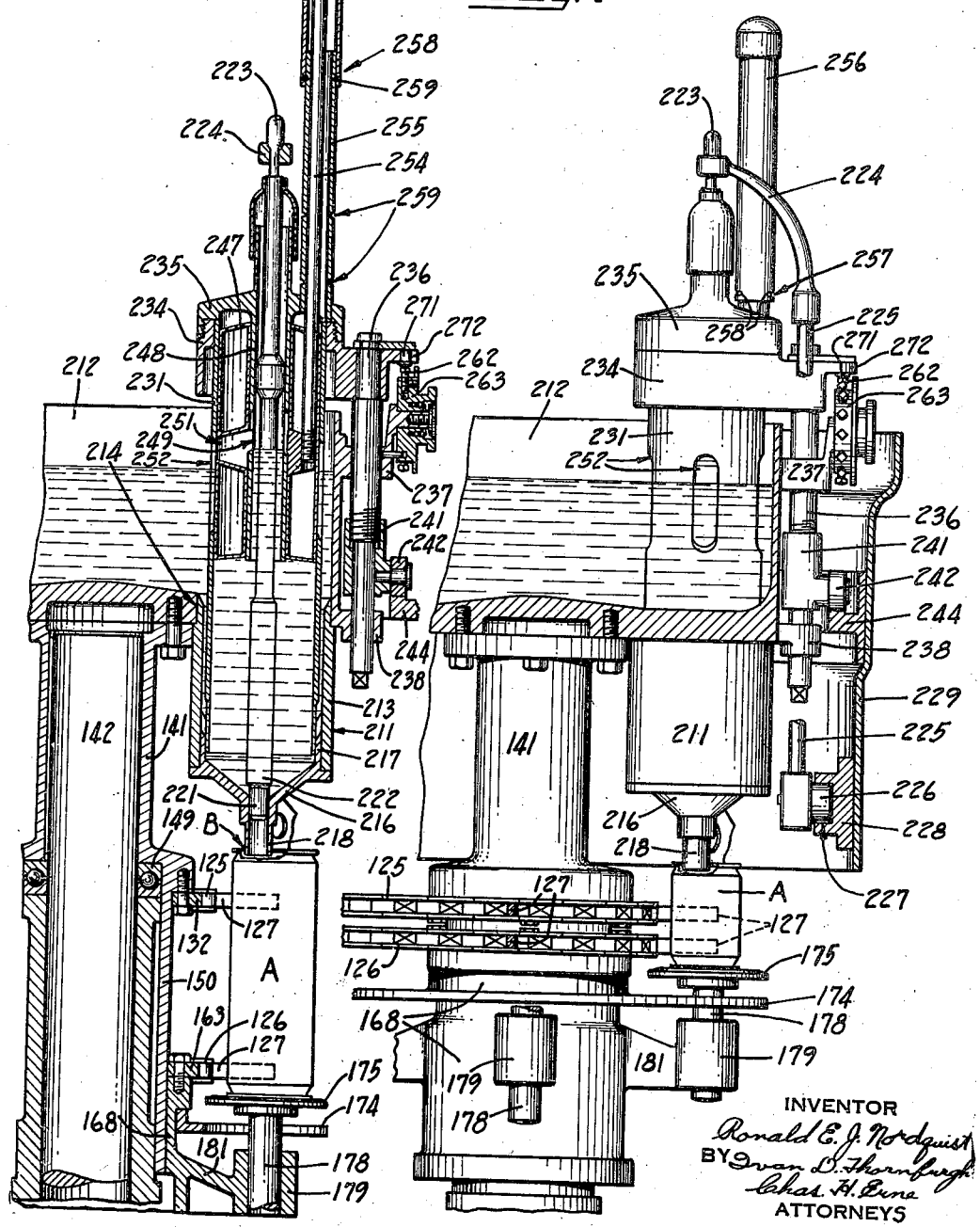

INVENTOR
Ronald E. J. Nordquist
BY Ivan D. Thornburgh
Chas. H. Erne
ATTORNEYS

Aug. 6, 1946.    R. E. J. NORDQUIST    2,405,232
LIQUID FILLING MACHINE
Filed Sept. 7, 1940    10 Sheets-Sheet 9

INVENTOR
Ronald E. J. Nordquist
BY
ATTORNEYS

Aug. 6, 1946.   R. E. J. NORDQUIST   2,405,232
LIQUID FILLING MACHINE
Filed Sept. 7, 1940   10 Sheets-Sheet 10

Patented Aug. 6, 1946

2,405,232

UNITED STATES PATENT OFFICE 2,405,232

LIQUID FILLING MACHINE

Ronald E. J. Nordquist, Maplewood, N. J., assignor to American Can Company, New York, N. Y., a corporation of New Jersey Application September 7, 1940, Serial No. 355,845

3 Claims. (Cl. 226—95)

The present invention relates to a machine for filling liquids, such as milk and the like, into fibre containers and has particular reference to a universal machine which may be rapidly changed over to accommodate containers of different dimensions and to fill into them different volumes of the same liquid or of different liquids having different viscosities.

In recent years the packaging of milk and milk products in fibre containers has become quite popular. Such milk products cover a wide range of varieties such as ordinary milk, chocolate milk, buttermilk, cream, heavy cream, etc. In order to meet the demands of the trade these products are packed in different sizes of containers which include half-pint, pint, quart and two quart containers. It is manifest that such a variety of containers of different volumes are of different dimensions as to height and cross section.

Nearly all dairies handle this wide variety of milk products and containers with the exception of the two quart size and more and more of them are adapting the fibre type of container including in some cases the two quart size. Filling of the containers is usually done by machinery so that accurate measurement and speed in filling may be obtained.

However, such a wide range of milk products and container sizes makes necessary considerable machinery which only the larger dairies can afford to use. In the smaller dairies considerable of the individual machines for the individual sizes would be idle most of the time, if such multitudinous machines were installed, because of the relatively small quantities of the individual products packed. Hence the smaller dairies must sometimes forego the use of filling machinery and are to that extent at a disadvantage in competing with the larger dairies.

The instant invention contemplates overcoming this difficulty by providing a universal machine which may be rapidly changed over from one kind of milk to another and from one size of container to another so that the entire range of milk products and containers may be used in the same machine, thereby giving the smaller dairies in one machine the benefit of the more expensive varied machinery used by large dairies.

An object of the invention therefore, is the provision of a universal machine for filling liquids into containers wherein the various operating parts of the machine may be arranged to accommodate containers of different heights and of different cross-sectional dimensions so that a change from one size of container to another may be quickly made.

Another object is the provision in such a machine of devices for measuring and filling liquids in volumes corresponding to the volume of the container to receive the liquid.

Another object is the provision in a machine of this character, of devices for controlling the volume of the liquid measured in respect to its viscosity so that different kinds of liquids may be accurately measured and filled into the containers.

Another object is the provision in such a machine of instrumentalities for controlling the liquid filling time so that containers having greater volumes than others may have sufficient time to receive their full volume of liquid.

Numerous other objects and advantages of the invention will be apparent as it is better understood from the following description, which, taken in connection with the accompanying drawings, discloses a preferred embodiment thereof.

Referring to the drawings:

Figure 1 is a front elevation of a machine embodying the instant invention, with parts broken away and other parts shown in section;

Fig. 2 is a top plan view taken substantially along a plane indicated by the broken line 2—2 in Fig. 1, with parts broken away and other parts shown in section;

Fig. 3 is an end view of the machine as viewed from the left in Fig. 1, with parts broken away;

Fig. 4 is a view similar to Fig. 3 showing the movable parts in a different position for the larger container shown in this view;

Fig. 5 is a longitudinal section taken substantially along the broken line 5—5 in Fig. 2 and showing the machine parts in position for the larger container illustrated in this view, with parts broken away;

Fig. 6 is an enlarged fragmentary detail section taken substantially along the line 6—6 in Fig. 2;

Fig. 7 is a part elevation and part sectional view of the upper portion of the machine and taken substantially along a plane indicated by the line 7—7 in Fig. 2, with parts broken away;

Fig. 8 is a radial section similar to Fig. 7 and taken substantially along the line 8—8 in Fig. 2, the movable parts of the machine being set to accommodate the larger size container shown in this view;

Figure 14:
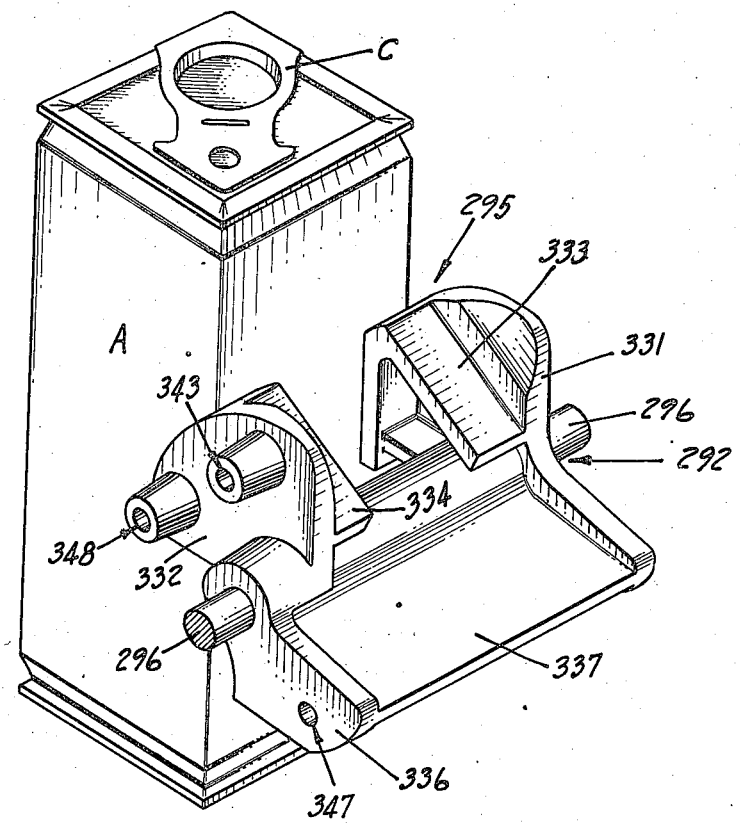
Fig. 14 is an enlarged perspective view of a container and of the centralizing device at the sealing station.

As a preferred embodiment of the instant invention the drawings illustrate a universal machine for filling milk products into square fibre containers of the character disclosed in United States Patent 2,085,979, issued July 6, 1937, to J. M. Hothersall, on Container. Such a container, designated by the letter A in Figs. 2 and 14, is formed with a filling and dispensing opening B located in the top of the container. When the container is filled the opening B is closed and sealed with a plug closure element C which is hingedly connected to the container top adjacent the opening.

Upon entering the machine the containers A are in upright position, with their filling openings B uncovered or open and with the closure elements C standing upright adjacent the openings. The containers enter in a continuous procession and are individually separated from the processional line and are advanced through the machine in timed order. During this advancement each container is filled, its closure element C is pressed down into the filling opening B to close and seal it, and it is then discharged from the machine to any suitable place of deposit.

The containers A are introduced into the machine by way of an endless belt conveyor 11 (Figs. 1, 2, 3, 4 and 5), the machine end of which takes over a driving pulley 12. The pulley is mounted on a short shaft 13 carried in a pair of spaced bearings 14 formed on a bifurcated yoke 16. The yoke is formed on the upper end of a vertical stem 17 carried in a bracket 18 bolted to a frame 19 which constitutes the main frame of the machine.

In order to accommodate different heights of containers in the machine the belt conveyor 11 is adapted to be readily raised or lowered into the proper position and then it may be locked against shifting. For this purpose the yoke stem bracket 18 is provided with a removable locking pin 22, the inner end of which fits into holes 23 formed in the yoke stem 17. There are preferably three of these holes, one for a tall quart size container, one for a shorter and smaller cross-sectional pint size container and one for a still shorter half-pint size container having a cross section equal to the pint size.

To set the belt height the locking pin 22 is removed, the yoke stem manually raised to the desired height and the locking pin replaced, its inner end being inserted into the hole 23 corresponding to this height. In the drawings Figs. 4 and 5 show the belt conveyor set for the quart size container and Figs. 1 and 3 show it set for the half-pint size container.

The belt conveyor driving pulley 12 is rotated by a sheave 25 which is secured to the outer end of the pulley shaft 13. This sheave is rotated by an endless driving belt 26 which takes over the sheave and also takes over an idler sheave 27, a driving sheave 28 and a belt tightener sheave 29.

The idler sheave 27 is carried on the outer end of a stationary arm 32 which is loosely mounted on the pulley shaft 13. The arm is keyed against movement by a tongue and groove connection 33 with the adjacent bearing 14 of the pulley yoke 16.

The driving sheave 28 is mounted on a short pin 35 (Fig. 2) which is carried in a boss 36 formed on a side of a column 37 bolted to the main frame 19. The sheave is keyed by a tongue and groove connection 41 to a sprocket 42 mounted on the pin 35 adjacent the sheave. This sprocket is rotated by an endless chain 43 which takes over a driving sprocket 44 mounted on a drive shaft 45 which constitutes the main drive shaft of the machine. The drive shaft is journaled at its ends in bearings 46 formed in the main frame 19. This drive shaft may be rotated in any suitable manner.

The belt tightener sheave 29 (Figs. 1 and 3) is carried on a stud 51 secured in a belt tightener lever 52 which is loosely mounted on a short shaft 53 journaled in a long bearing 54 formed as a part of a slide bracket 55 carried in a vertical slideway 56 formed on a side of the main frame 19. Gibs 57 secured to the main frame hold the bracket in its slideway.

The bracket 55 may be manually raised and lowered to bring it into position corresponding with the yoke 16. For this purpose there is provided a handle 58 which is carried on a pivot pin 59 secured in a lug 60 formed on the main frame 19. A link 61 connects the handle with the bracket. A removable pin 62 is also provided for insertion into holes 63 in the frame which corresponds to the different heights of containers.

The tightener lever 52 is formed with a handle 64 by which it may be manually shifted to draw the belt 26 taut after positioning of the yoke 16 and bracket 55. The lever is also formed with an arcuate slot 65 in which a locking stud 66 operates. This stud is threaded into the bracket 55 and is formed with a handle 67 for tightening it against the lever to hold the latter in an adjusted position.

Thus when the conveyor 11 is raised or lowered to accommodate a desired height or size of container, any slack or tightness in the driving belt 26 may be quickly compensated for by manipulation of the belt tightener lever 52. Figs. 3 and 4 of the drawings show two different positions of the lever and the belt for two different heights of containers.

The containers A entering the machine on the belt conveyor 11 are maintained against lateral displacement by pairs of upper and lower spaced and parallel side rails 68 (Figs. 1, 2, 3, 4 and 5). Thus for short containers such as shown in Figs. 1 and 3, the upper guide rails 68 alone are used to guide the containers. For taller containers such as shown in Figs. 4 and 5 both upper and lower rails are used.

One set of these rails is formed on a vertical stationary bracket 69 which is secured to a horizontal support bracket 70 bolted to a side of the main frame 19. The other set of guide rails is formed on a movable bracket 71 which slides in a tongue and groove connection 72 with the bracket 70.

Hence for containers of different cross sections the movable bracket 71 may be shifted relative to the stationary bracket 69 so that the space between the guide rails will be proper to accommodate the desired container. A setscrew 73 threaded in the base of the movable bracket is provided to lock the bracket in position after it is located. The inner end of the setscrew is adapted to engage in spaced holes formed in the support bracket 70 to hold the movable bracket against shifting.

Adjacent the inner end of the guide rails 68 movement of the contiguous containers A entering the machine is arrested by an end stop 75 (Figs. 2, 3, 4 and 5) which is bolted to the top of the main frame 19. At this stop, the foremost container in the procession is pushed out in a lateral direction and is thus separated from the other containers and is ready for further advancement. It is this separation operation that marks the beginning of individual container travel through the machine in timed order.

Separating of the containers is preferably effected by a channel shaped pusher head 78 which is formed with a front wall 79 and a pair of laterally extending side legs 81, 82. The head is carried on the inner end of a swinging arm 83. The arm is mounted on the upper end of a vertical shaft 84 which is carried in the column 37. The shaft extends below the bottom of the column and carries on its lower end a cam arm 85. The cam arm carries a cam roller 86 which operates in a cam groove 87 formed in a barrel cam 88 mounted on the main drive shaft 45.

Hence as the cam 88 rotates with the drive shaft the arms 83, 85 on shaft 84 are rocked first through a forward or pushing stroke and thence on a return stroke. On the forward stroke of the arm 83 the pusher head 78 engages against the outer side of the container which is then against the stop 75 and pushes it out of the line of containers on the conveyor belt 11. In thus separating the inner container from the others the pusher head moves into the path of travel of the incoming containers and thus holds them back against advancement until the innermost container is completely separated. On the return stroke of the pusher head it moves out of the path of travel of the incoming containers and thereby permits the conveyor belt 11 to move the next container in the line into engagement with the stop 75.

In order to accommodate containers of different heights and different cross sections the pusher head 78 is proportioned in an off-center manner and is carried on the end of its arm 83 in an off-center position. For this purpose the head is carried on a pivot stud 91 (Fig. 4) which extends through a depending wall section 92 formed on the end of the pusher arm 83. The inner end of the pivot stud is threaded into the front wall 79 of the head in an off-center position and is surrounded by a compression spring 93 which keeps the head in tight engagement with the arm wall section 92. The head is held in place by a tongue and groove connection 94 formed between the head front wall 79 and the arm wall section 92.

With this construction the pusher head 78 may be pulled outwardly against the compression spring 93 and rotated on its pivot stud 91. It has one position as shown in Fig. 4 or it may be inverted into a second position as shown in Fig. 3.

When the pusher head 78 is in the position shown in Fig. 4 it accommodates the tall or quart size container. For such a container the greater portion of the head extends below the pivot stud 91. Thus the entire hold-back face 79 of the head engages the incoming containers while holding them back and the side leg 81 of the head constitutes the pushing element for separating the containers.

When the pusher head 78 is in the position shown in Fig. 3 it is adapted to the pint and also the half pint size containers. These containers are preferably of equal cross section but the one is twice as tall as the other but not as tall as the quart size container. Hence only a portion of the front wall 79 of the inverted pusher head now engages the containers for holding them back and the side leg 82 which is spaced further away from the pivot stud 91 than the leg 81, now constitutes the container separating wall.

Hence the stroke of the head arm 83 is the same for all containers. The difference in cross section of the containers is compensated for by the difference in location of the pusher legs 81, 82 relative to the pivot stud 91.

A container A pushed out of the line of the incoming containers slides off the conveyor belt 11 and is received on a stationary table 101 which extends the full length of the machine. The table, though generally of a stationary character, is movable vertically to bring it into the plane of the upper run of the conveyor belt 11. This is to accommodate the different heights and sizes of containers brought into the machine by the conveyor.

The table is mounted on the upper end of a vertical rod 102, which is carried in upper and lower spaced bearing bosses 103, 104 (Figs. 3 and 5), formed in the main frame 19. After the table is located relative to the conveyor belt 11, it is locked in position by a pin 105 which when in place extends through a hole in the boss 103 and projects into a similar hole 107 formed in the rod 102. There are preferably three of these holes 107, one for each height of container to be accommodated.

Raising and lowering of the table to bring the proper hole 107 into register with the locking pin 105 in the boss 103 is preferably effected by a lever 111 (Fig. 3). The lever is mounted on a pivot pin 112 carried in a lug 113 formed in the main frame 19. One end of the lever is engaged in a slot 115 formed in the vertical rod 102. The other end of the lever is formed with a handle 116 for manual actuation.

The weight of the table is partially counterbalanced by a tension spring 117. One end of the spring is secured onto the main frame 19 while the other end is engaged into a hook 118 secured in the lever 111 adjacent its handle 116.

A container A received on the table 101 is propelled thereacross, first along a curved path of travel and thence along a straight path of travel toward the end of the machine, this being at the right as viewed in Fig. 2. During this travel of the container it is guided by an inner curved and straight guide rail 121, an outer curved guide rail 122 and an outer straight guide rail 123. The guide rail 121 is fixed and is bolted to the top of the table 101. The curved guide rail 122 is formed as an integral part of the container entrance stop 75 and this stop and the guide rail 123 are adjustably bolted to the table 101 to accommodate containers of different cross sectional dimensions.

The container is propelled along this predetermined path of travel in an intermittent or step-by-step advancement by a pair of spaced upper and lower horizontal and parallel endless chain conveyors 125, 126 (Figs. 1, 2 and 5) having a plurality of feed dogs 127 secured at spaced intervals along their lengths. The upper conveyor 125 operates over an idler sprocket 131 and a driving sprocket 132. Idler sprocket 131 is mounted on the upper shouldered and flanged end of a vertical sleeve 143 rotatably carried on a stationary shaft 135 which is disposed adjacent the container feed-in end of the machine. The lower end of the shaft extends down through an opening 136 in the table 101 and is secured in a block 137 bolted to the top of the main frame 19.

The driving sprocket 132 is bolted to an enlarged shouldered section of a vertical sleeve 141 which is keyed to a vertical drive shaft 142 disposed adjacent the opposite end of the machine. The drive shaft is journaled in a long vertical bearing 143 which extends down through an opening 144 in the table 101 and which at its lower end is formed with a flange 145 which is bolted to the main frame 19 adjacent an opening 146 formed therein.

The sleeve 141 is supported on top of the vertical bearing 143 and for this purpose the sleeve is formed with a bearing seat 148 which retains a ball bearing 149. The ball bearing surrounds the drive shaft and is interposed between the sleeve seat and the top of the shaft bearing and permits free rotation of the sleeve. The lower portion of the sleeve, indicated by the numeral 150, extends down adjacent the outer surface of the shaft bearing 143 in rotating engagement therewith.

Rotation of the vertical drive shaft 142 and the parts carried thereon is preferably effected by an indexing plate 155 which is secured to the lower end of the shaft. The plate carries a plurality of cam rollers 156 which are spaced around the outer edge of the plate. These rollers are adapted to be individually engaged in a cam groove 158 of a cam 159 mounted on and rotating with the main drive shaft 45.

Hence on each revolution of the cam 159 the cam groove 158 engages and moves a cam roller 156 and thus shifts the plate 155 and its vertical drive shaft 142 through a partial rotation which is equal to the distance between the rollers on the plate. It is this intermittent motion that operates the chain conveyor 125 and the result is that the container is propelled along its course in a step-by-step manner.

The lower chain conveyor 126 is also operated in synchronism with the conveyor 125 by the same driving mechanism just described but is arranged so that it may be raised or lowered relative to the upper conveyor and with the table 101 for the accommodation of the different height containers. For this purpose the lower conveyor 126 operates over an idler sprocket 162 and a driving sprocket 163.

The idler sprocket 162 is slidably mounted on the vertical sleeve 134. The hub of the sprocket is formed with a shoulder flange 165 (Fig. 5) which engages against the top of the table 101 and which rotates within a retaining recess formed in a split ring 166 bolted to the table. Hence the sprocket is free to rotate but is retained against displacement from the table. Thus the sprocket will move with the table and slide along the sprocket sleeve 134 when the table is raised or lowered as hereinbefore explained.

In a similar manner the driving sprocket 163 of the lower conveyor 126 is arranged to move with the table 101. This driving sprocket 163 is bolted to a tubular hub 168 which surrounds the lower portion 150 of the sleeve 141. The hub is keyed to this sleeve portion 150 and therefore rotates with it but is adapted to slide on it in a vertical direction. The lower end of the hub carries a projecting flange ring 169 which is seated in a recess 171 formed in the table 101 around its opening 144. The flange ring is retained against displacement from the table in the recess by an annular gib or ring 172 which is bolted to the table and which surrounds the hub 168.

As the container A, advancing along the table 101 moves adjacent the driving sprockets 132, 163 of the respective conveyor chains 125, 126 it slides off the table 101 and moves onto a rotating disc 174 where it is received on a lifter pad 175 of a milk filling mechanism located at this end of the machine. The disc 174 surrounds the tubular hub 168 and is secured to it for rotation therewith. There are preferably four lifter pads 175 and they are disposed in openings 176 formed in the disc.

Each lifter pad 175 is formed on the upper end of a vertical stem 178 carried in a bearing 179 on a lug 181 formed on the tubular hub 168. The lower end of the stems 178 ride on a ring cam 184 which rests on the table 101 in an annular recess 185 formed therein. The cam is formed with an inwardly extending flange 186 which is engaged by the gib 172 and is thereby held against displacement. With this construction the lifter pads 175, the disc 174 and cam 184 all move with the table 101 when it is raised or lowered to accommodate different heights or sizes of containers.

The lifter pad disc 174 is rotated intermittently in time with the chain conveyors 125, 126 and this timing is preferably such that a container A comes into full position on its lifter pad just at the termination of one of these intermittent advancements. The lifter pad raises the container vertically upward into milk filling position as shown in Figs. 1 and 5. This lifting is effected immediately upon the container being received on the lifter pad and while the disc 174 and the conveyors 125, 126 are stationary. Filling of the container thus begins as soon as possible and this increases the filling time.

This immediate lifting of the container while the container advancing parts of the machine are stationary is brought about by a shifting or partial rotation of the ring cam 184 in its seat 185. This brings the high portion of the cam into operation against the then stationary lifter pad stem 178 thereby lifting the pad to its full height in one sweep. This is brought about by a segment gear 191 (Figs. 12 and 13) which meshes with a gear segment 192 formed on the outside of the ring cam 184. The segment gear 191 is formed on the end of an actuating arm 193 mounted on a vertical shaft 194. Shaft 194 is carried in a pair of spaced bearings 195 formed in the main frame 19. A cam arm 197 is mounted on the lower end of the shaft 194. This arm carries a cam roller 198 which operates in a cam groove 199 (Fig. 5) of a barrel cam 201. The cam 201 is mounted on the main drive shaft 45 adjacent its bearing 46 this being shown at the right in Fig. 5.

The cam 201 is shaped to shift the ring cam 184 at the proper time and hold it in this shifted position until the lifter pad disc 174 begins its next partial rotation. The ring cam 184 then shifts back into its original position in time with the movement of the disc. This maintains the raised lifter pad stem 178 on the high portion of the cam.

The filling of the raised container with its contents is performed while it is carried in two steps through substantially half a revolution of travel of the lifter pad disc 174. At the end of this curved path of travel the filled container is lowered to the level of the disc by the same ring cam 184 while the disc is stationary and on the same shifting movement that raises another container into filling position. Thus a maximum filling time is obtained in a minimum space.

Figure 12:
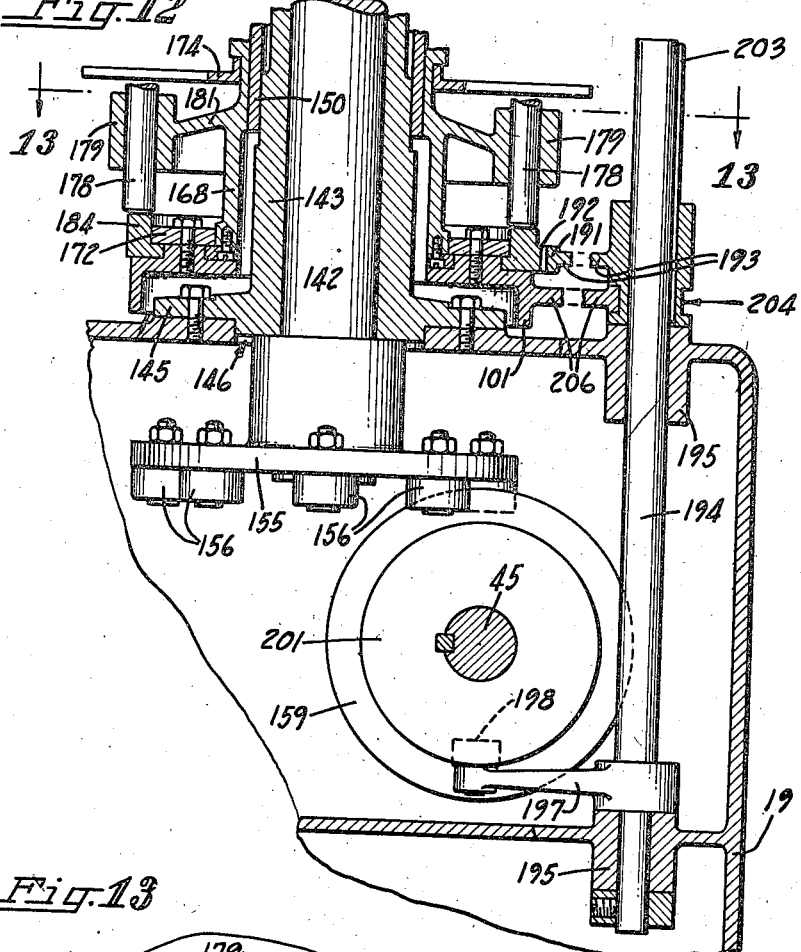
Fig. 12 is a horizontal section taken substantially along the line 12—12 in Fig. 5.
Figure 13:
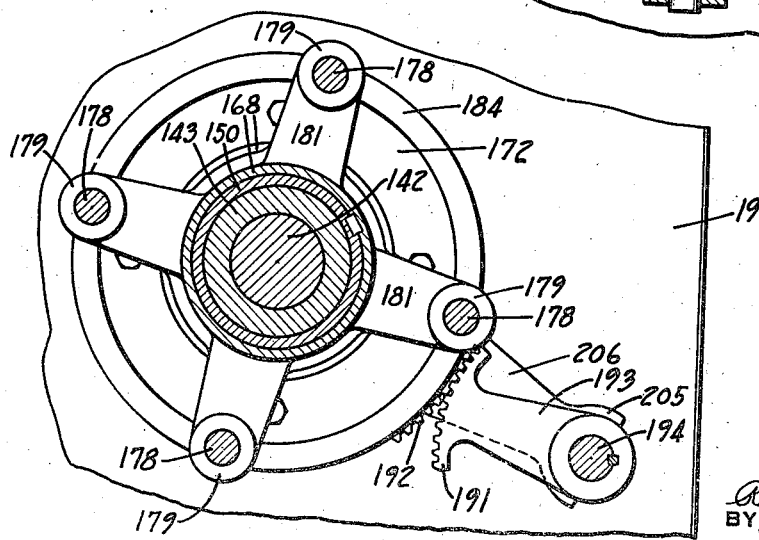
Fig. 13 is a horizontal section taken substantially along the line 13—13 in Fig. 12.

Provision is made for making this cam shifting mechanism effective for all heights of containers. For this purpose the segment gear arm 193 is slidably disposed on its actuating shaft 194 and moves on a long feather or key 203 carried in the shaft (Fig. 12). The hub of the arm is formed with a groove 204 which accommodates a bifurcated end 205 of a rigid arm 206 which extends out from the table 101.

Hence when the table 101 is raised or lowered to accommodate the height of a container A, the rigid arm 206 carries the segment gear arm 193 with it, sliding it along its feather 203 in the actuating shaft 194 and holding it in operating position when the table is locked in place or adjusted position.

Filling of the milk contents into the raised container A while it is on its lifter pad 175 is preferably carried out by way of a filling head 211 (Figs. 7 and 8) which is disposed above the container. This filling head is of the character disclosed in United States Patent 2,144,628, issued to J. M. Hothersall, on Filling machine. There are a plurality of these filling heads, one for each lifter pad 175 and they extend down from the bottom of a milk reservoir 212 which is secured to the top of and which rotates with the vertical sleeve 141 on the shaft 142.

Each filling head 211 includes a tubular member 213 which is secured in an opening 214 formed in the bottom of the tank 212. The lower end of the member is closed by a funnel shaped cap 216 having a vertical rim 217 which extends up inside the member. The cap is formed with a depending cylindrical nozzle 218 which extends into the dispensing opening B in the container A when it is lifted into filling position by its lifter pad 175 as hereinbefore explained.

Delivery of the milk from the nozzle 218 is controlled by a valve mechanism which includes a valve plunger 221 normally disposed within the nozzle as shown in Fig. 8. The valve plunger is formed on a vertical valve stem 222 which extends up above the top of the tank. The upper end of the stem is fastened, by way of a universal joint 223, to an arm 224 (Fig. 7) formed on the upper end of a vertical actuating rod 225 which is located outside the tank. This actuating rod is carried in suitable bearings which are formed on the outside of the tank 212.

The lower end of the actuating rod 225 carries a cam roller 226 which operates in a cam groove 227 of a stationary ring cam 228 secured to the inside of a shield 229 which extends around the filling mechanism. The shield is preferably supported on suitable brackets secured to the machine main frame 19. Thus as the filling head travels with the sleeve 141 and shaft 142 the cam roller traverses the cam groove 227 and this raises and lowers the valve stem 222 and the attached valve plunger 221 in time with the other moving parts of the machine.

Before the nozzle valve is opened, a predetermined charge of milk in the tank 212 is measured out by a cylindrical measuring element 231 (Figs. 7 and 8) which is located in the filling head 211. The measuring element surrounds the valve stem 222 and extends down into the tubular member 213. The element is preferably straight and is open at both ends. The lower end of the element fits snugly within the rim 217 of the head cap 216.

The upper end of the measuring element 231 is secured in a movable bracket 234 which is provided with a screw cap 235. The bracket is mounted on a vertical rod 236 which is located outside the tank 212. The rod is carried in a pair of spaced bearing lugs 237, 238 formed on the outside of the tank. Between the bearings a collar 241 is threaded on the rod 236 and this collar carries a cam roller 242 which operates on a ring cam 244 secured to the inside of the shield 229.

Thus as the filling head 211 rotates with the column 141 inside the shield 229, the cam roller 242 traverses the cam track of the cam 244. During its rotation around the column and prior to the opening of the valve 221, the cam 244 raises the measuring element 231 within the head so that the lower end of the element is above the rim 217 of the head cap 216. This action permits the milk in the tank 212 to enter into the measuring element and fill it to the level of the milk in the tank. The measuring element then moves down into its original position with its lower end inside the rim 217 and this isolates the milk within the measuring element from the milk within the tank.

The specific volume in liquid measure confined within the measuring element 231 is controlled by a measuring block 247 which fits snugly within the upper portion of the measuring element. This block surrounds a vertical tube 248 formed integrally with the cap 235 and extends down into the measuring element below the level of the milk in the tank 212. The tube is formed with a pair of oppositely disposed slots 249 which are located a predetermined distance above the milk level in the tank.

Hence when the measuring element 231 is in an up position and as the milk flows into it, the milk level rises up into contact with the bottom of the measuring block 247 and also rises in the tube 248 to the level of the milk in the tank. When the measuring element moves down the block 247 forces the milk further up into the tube above the level in the tank and causes some of it to overflow out of the tube slots 249. This milk flows out of openings 251 in the block and through slots 252 in the measuring element and thus returns to the tank. When the measuring element comes to rest in its lowermost position the quantity of milk confined within the measuring element up to the level in the tube 248, this being at the level at the bottom edge of the slots 249, such amount of milk is a predetermined measured quantity which is the exact amount to be filled into the container A when the valve 221 in the nozzle 218 is opened.

In Fig. 8 the drawing shows the measuring block 247 in position for measuring one quart liquid measure for the quart size container A shown on the lifter pad 175. For other sizes of containers such as the pint or the half-pint (shown in Fig. 7) the measuring block is adapted to be manually shifted down into the measuring element to its proper position for confining the desired quantities of milk within the measuring element.

To effect such a purpose the measuring block 247 is carried on a vertical rod 254 which extends up through one side of the block and up through a support tube 255 secured in the cap 235 in an off-center position. The rod extends above the support tube and is secured to a sleeve 256 which surrounds the tube. Near the bottom the sleeve is formed with a pair of slots 257 which are adapted to accommodate a removable spring hair pin 258. This hair pin extends through the slots and engages into notches 259 formed in the outer surface of the tube 255.

There are three notches 259, an upper notch for the quart size container, an intermediate notch for the pint size container, and a lower notch for the half-pint size container. Thus by removing the hair pin and sliding the sleeve 256 up or down on the tube 255 to bring the sleeve slots 257 into line with the proper notch 259 and reinserting the pin, the block 247 may be positioned in the proper place to accommodate a desired container.

When the measuring block 247 is adjusted for either the pint size container or for the half-pint size as will be seen from the position of the notches 259 in Fig. 8, the top of the block will be below the tube slots 249. Hence when the measuring takes place for a pint size container milk discharging from these slots will flow down over the top of the block and fall into the milk in the tank 212. In the case of the half-pint size container the top of the block will be below the level of the milk in the tank. Hence while being measured for this size container milk discharging from the slots 249 will fall directly into the milk in the tank. In both of these cases the openings 251 in the measuring block will be in a closed off position below the slots 252 in the measuring element 231 and therefore will not be used. These openings are not necessary for the pint and half-pint sizes of containers since discharged milk flows out over the top of the block.

Since the machine is adapted for use also with different kinds of milk or liquids of varying viscosity, provision is made for a fine adjustment of the measuring element to insure accuracy of fill. Liquids such as cream, chocolate milk, buttermilk and heavy cream are of heavier consistency than ordinary milk and hence a slightly greater quantity adheres to the measuring elements when the liquid is drained from them and it is for this purpose that the measuring element is set slightly differently for each kind of milk. This setting insures that the exact liquid measure of the liquid is filled into the container.

The exact setting is made possible by a plurality of adjustable setscrews 262 (Figs. 7, 8, 9 and 10) which are threaded in radial position in a dial wheel 263 carried on a pivot stud 264 formed on the bracket lug 237 of the tank 212. The wheel is frictionally under pressure of a compression spring 265 disposed within a recess 266 formed in the wheel. The spring is held in place by a large headed screw 267 which is threaded in the outer end of the pivot stud. The wheel is locked against movement by a pin 268 which is secured in the bearing lug 237 and which extends into a hole 269 formed in the dial wheel. There are a plurality of these holes, one adjacent each setscrew 262.

Hence by pulling the dial wheel outwardly against the pressure of its spring 265 the pin 268 may be disengaged from its hole 269 and the wheel may be thereupon rotated to any desired setting and reset in locked position (that is, with pin 268 in the desired hole 269) for operation under the control of the proper setscrew. Thus when the measuring element 231 moves down into measuring position a pin 271 in a lug 272 formed on the measuring element bracket 234, engages the positioned setscrew 262 and thereby stops the measuring element in the proper vertical position for the exact desired liquid measure.

There is one of these setscrews 262 for each kind of milk above mentioned and one for each size of container. In order to identify the screws a dial 275 is formed on the wheel 263 and this dial is divided into three sections according to size of container, namely, a quart section 276, a pint section 277, and a half-pint section 278. Each section is sub-divided under the headings, milk, cream, choco for chocolate milk, bu. milk for buttermilk, and H cream for heavy cream and there is a setscrew 262 adjacent each of these headings. Each screw for each grade of milk and container is preferably initially set by trial and experiment and afterwards is locked against movement by a headless setscrew 279 which is threaded into the wheel at an angle to the adjustable screw.

After a container A has been filled with its contents the lifter pad 175 on which it is supported is lowered to the level of the lifter pad disc 174 as hereinbefore mentioned and is then ready for sealing. The filled container is removed from its lifter pad by the engaging conveyor dogs 127 and is then propelled along a straight line path of travel toward the entrance end of the machine.

During this latter movement the container is guided by a fixed inner guide rail 281 (Figs. 2 and 6) which is bolted to the vertically movable table 101 and by a movable guide rail 282 which may be shifted laterally to accommodate the different sizes of containers. The movable guide rail 282 is formed with bracket lugs 283 which extend under the conveyor table 101 and are bolted to the table by cap screws 284. A slot in the lugs provides for shifting the guide rail in setting it for different sizes of containers.

As the filled container moves along this straight path of travel between the guide rails 281, 282 it first passes under a closure element closing rail 286 (Figs. 1 and 2) having an upturned end 287 which is disposed above the path of travel of the containers. The rail is fastened to a bracket 288 which is secured to the shield 229.

Hence as the container moves under the rail its upstanding flap or closure element C is turned down against the top of the container. This action presses the plug section of the closure element tightly in place in the filling and dispensing opening B.

Closing of the flap C is followed by the expanding of the flap plug section to seal the flap and to prevent its accidental opening during further handling. For such expanding the container moves into a sealing station where the sealing operation is performed by a sealing head 291 (Figs. 1, 2 and 6) while the container is held in proper position by a centralizing device 292.

The centralizing device 292 includes an H-shaped member 295 which is disposed adjacent the path of travel of the containers. Member 295 is rotatably mounted on a short shaft 296 carried in a pair of substantially vertical side arms 297. The arms are mounted on a pivot pin 298 which extends through a spacer bearing 299 formed in a horizontal bracket 301 which overhangs the path of travel of the containers. The bracket is secured to the upper end of a cylindrical column 302 bolted to the top of the machine main frame 19.

The centralizing member 295 is adapted to be periodically rocked into and out of the path of travel of the containers for the centralizing operation. This rocking motion is brought about by a yieldable link which includes a vertical rod 305 having its lower end secured in a pivot block 306 mounted on a pivot stud 307 carried in a lug 308 formed on the side arms 297. The upper end of the rod extends through the outer end of a horizontal bracket arm 311 and is held against disconnection therefrom by a large head screw 312 which is threaded into the end of the rod. A compression spring 313 surrounds the rod and is interposed between the bracket arm and a nut 314 threaded on the rod and thus forms the yieldable portion of the link.

The bracket arm 311 is secured to the upper end of a vertically movable bar 318 which is carried in the column 302. The lower end of the bar extends below the column and is formed with a slot 319 (Fig. 5) in which operates the outer end of a leg 321 of a bell crank 322. The bell crank is carried on a stud 323 which is secured in a side of the main frame 19. The other leg of the bell crank designated by the numeral 324 carries a cam roller 325 which operates in a cam groove 326 of a barrel cam 327 keyed to the main shaft 45.

In the different sizes of containers herein considered, the closure elements C and the filling openings B are the same size and are all in the same location relative to one corner of the container top. Each container therefore must be centralized in a predetermined position relative to its closure element and this in turn is brought into a predetermined position relative to the sealing head 291 when a container is stopped thereunder.

Figure 15:
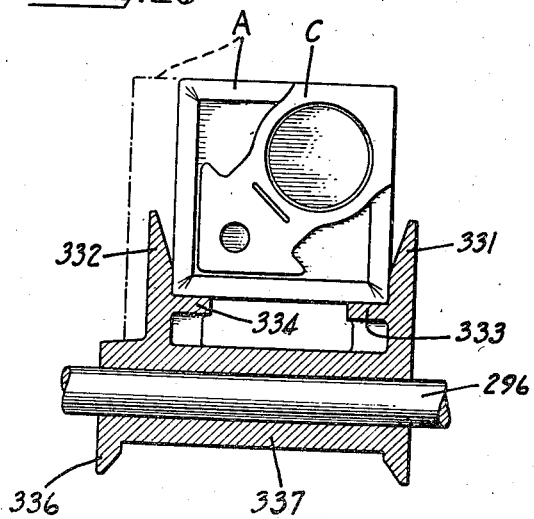
Fig. 15 is a top plan view of a container and a sectional view of the centralizing device showing how the latter fits containers of different cross sectional sizes.

For this purpose the centralizing member is formed with a pair of spaced side wings 331, 332 (Figs. 6, 14 and 15) each provided with a pair of inwardly extending cross webs 333, 334 as shown in the drawing. The side wing 331 is straight throughout, while the side wing 332 is formed with an offset section 336. This section is connected with the wing 331 by a cross web 337.

Hence for a half-pint size container the centralizing member 292 is manually rotated on its shaft 296 to bring the cross web 333 into a vertical position as shown in Fig. 6. The centralizing member then may be locked in this position by a removable pin 341 which is carried in a hole 342 in one of the side arms 297 and projects into an aligning hole 343 formed in the side wing 331.

With the centralizing member in this position and when it is moved toward a half-pint container brought to rest at the sealing station by the conveyor 125 and its dogs 127, the side wings 331, 332 straddle and engage the sides of the container and hold it against movement longitudinally of the machine. The cross-web 333 also engages against the outer side of the container and forces it over against the inner guide rail 281 and against a top guide 345. While the container is so held the sealing operation is performed.

For the pint size of container the centralizing member 295 is rotated on its shaft 296 to bring the cross-web 334 into a vertical position adjacent the path of travel of the containers and is locked in position by the pin 341, the inner end of which now engages in a hole 347 formed in the member side wing 332. Since the pint size container is the same cross section as the half-pint size the side wings 331, 332 readily straddle the container and centralize it under the head 291. The cross-web 334 however engages the container lower down, since the container is longer than the half-pint size, so that it will be nearer the middle of the container.

For the quart size of container the centralizing member 295 is rotated to bring the cross-web 337 into a vertical position adjacent the path of travel of the containers and the setting pin 341 is locked in a hole 348 in the side wing 332. This brings the offset section 336 of the side wing 332 in position to accommodate the greater cross section of the quart size container. The cross-web 337 is also nearer the pivot shaft 296 for this same purpose.

The sealing head 291 is preferably of the character disclosed in United States Patent 2,170,821, issued August 29, 1939, to John M. Hothersall et al., on Can closing machine. Such a head includes a round head body 351 (Fig. 6) which carries a plurality of radial slides 352 having depending segmental expanding jaws 353 formed on their inner ends. The slides are held in place against the bottom of the head by a bottom plate 354. The inner edges of the slides are formed with tapered surfaces 355 which are pressed against a central tapered wedge 356 by a coiled tension spring 357. The spring encircles the head and exerts its pressure directly against the outer ends of the slides.

The tapered wedge 356 extends up into a recess 361 formed in a stem 362 which projects upwardly from the head body 351. The stem is disposed within a bore 364 of a shouldered sleeve 365 which is secured in the centralizing device bracket arm 311. The wedge is also formed with a supporting rod 367 which extends up through the sleeve and is held stationary by a lock screw 368 and a vertical adjusting screw 369 which are threaded in the sleeve. A compression spring 371 coiled around the rod and interposed between a shoulder of the sleeve and the top of the head body stem 362 provides a flexible connection between the sleeve and the head body.

The normal position of the sealing head is above the path of travel of the containers and the top of the head is then above the upper edge of an opening 372 in the bracket 301. When the bracket arm 311 moves down to bring the centralizing member 295 into container centralizing position, it also lowers the sealing head through the opening 372 in bracket 301 and presses the bottom plate 354 of the head body 351 against the top of the container. This positions the contracted jaws 353 within the plug section of the container closure element C.

Continued downward movement of the bracket arm 311 compresses the spring 371 and forces the wedge 356 down alongside of the tapered surfaces 355 of the slides 352. This moves the slides outwardly against the resistance of the encircling spring 357 and thus expands the jaws 353. The jaws press against the side wall of the plug section of the closure element C and thereby form an outwardly projecting bead D (Fig. 6) which locks the closure element in sealed position.

This terminates the sealing operation and when the bracket arm returns on its upward stroke, the wedge is first raised to permit the jaws to contract. Then the head body is lifted free of the container. The latter may then be discharged from the machine.

Figure 10:
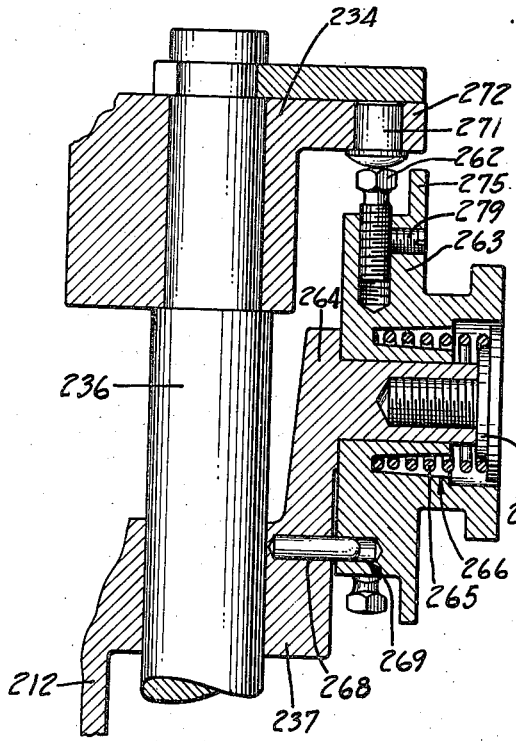
Fig. 10 is a sectional view taken along the line 10—10 in Fig. 9.
Figure 9:
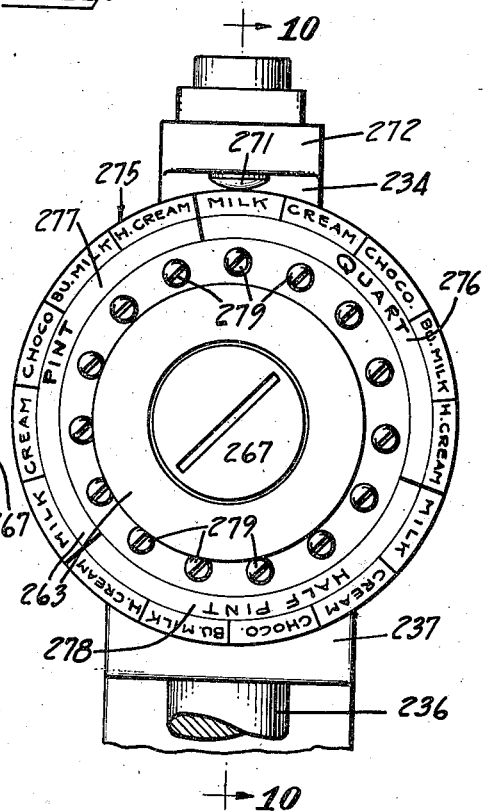
Fig. 9 is an enlarged detail of the dial shown at the upper right in Fig. 7, with parts broken away.
Figure 11:
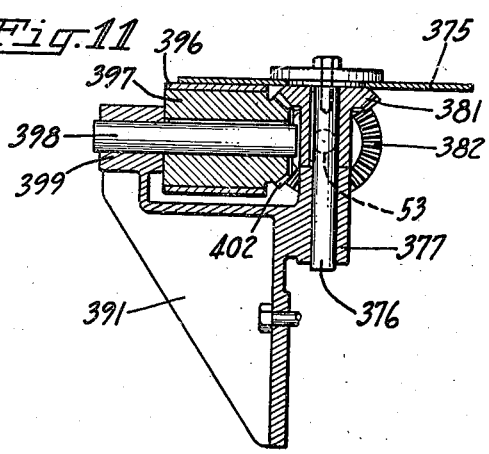
Fig. 11 is a transverse section taken substantially along the line 11—11 in Fig. 2, with parts broken away.

The conveyor 125 and its feed dogs 127, upon their next intermittent movement, advance the sealed container along the table 101 and deposit it on a rotating disc 375 (Figs. 2 and 11) disposed adjacent the table. The top surface of the disc is flush with the top of the table. The disc is secured to the upper end of a vertical shaft 376 which is carried in a bearing 377 formed as a part of the slide bracket 55 (see also Fig. 1) so that the disc will be raised and lowered with the entrance belt 11 when the latter is shifted to accommodate the machine to different heights of containers.

The disc 375 is rotated by a bevel gear 381 which meshes with and is driven by a bevel gear 382 carried on the gear shaft 53. The shaft 53 carries a gear 383 which meshes with and is driven by a gear 384 formed as a part of the belt tightener sheave 29.

Hence as the disc rotates it carries the sealed containers away from the conveyor 125. The containers move between a pair of outer curved guide rails 385, 386 and a curved extension 387 of the inner guide rail 282 and also an inner guide rail 388. The outer guide rail 385 is secured to the slide bracket 55 and the outer rail 386 is fastened to a bracket 391 bolted to the slide bracket 55 so that these guide rails will shift with the disc when the latter is moved to accommodate different heights of containers.

The inner guide rail 388 (see also Fig. 6) is secured to a bracket 392 which is mounted in a slideway 393 formed in the top of the main frame 19 so that it may be shifted laterally to accommodate containers of different cross sections. A spring held pin 394 in the bracket locks in one of two holes 395 formed in the slideway to retain the bracket in an adjusted position.

The sealed containers are discharged from the disc 375 to any suitable place of deposit preferably by an endless conveyor belt 396 (Figs. 1 and 2). The belt is adapted to carry away the containers from the machine in two different directions if desired. For this purpose the belt may extend longitudinally of the machine as shown in full lines in Fig. 2 or it may extend laterally of the machine as shown in dot and dash lines in the same figure.

When the discharge belt 396 carries the containers longitudinally of the machine, its machine end takes over a pulley 397 which is disposed under the disc and is mounted on a short stud shaft 398 held in a bearing 399 formed in the bracket 391. The pulley is driven by a bevel gear 402 which is carried on the shaft 398 and which is driven by the gear 381.

When the belt 396 carries the containers away from the machine in a lateral direction it operates on and takes over a pulley 403 (Fig. 1) which is carried on the gear shaft 53. In this position of the belt the outer curved guide rail 386 may be removed and other guide rails substituted to direct the containers from the disc onto the belt.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for filling liquids into containers of varying size comprising, liquid filling means, a horizontal table disposed below said filling means for receiving empty containers to be filled, a rotatable disc supported by said table for receiving containers therefrom, lifter elements supported by said table and bodily rotatable with said disc, said lifter elements having means for elevating the same relative to the disc, cooperating endless conveyors disposed in vertically spaced substantially horizontal planes above said table for advancing said containers in spaced relation on said table toward said disc and filling means, one of said conveyors being fixed against vertical movement and another of said conveyors being supported by said table, means for driving said conveyors and for rotating said disc, and common means for vertically adjusting said table with its supported disc and conveyor relative to the filling means to compensate for containers of varying size to be filled.

2. A machine for filling liquids into containers of varying size comprising, liquid filling means, a horizontal table disposed below said filling means for receiving empty containers to be filled, a rotatable horizontal disc supported by said table for receiving containers therefrom, a plurality of lifter pads supported by said table and bodily rotatable with said disc, said lifter pads having means for elevating the same relative to the disc, a pair of cooperating endless conveyors disposed in vertically spaced substantially horizontal planes above said table and passing around the axis of said disc for advancing said containers in spaced relation on said table toward said disc and filling means, the upper of said conveyors being fixed against vertical movement and the lower of said conveyors being supported by said table, common means for intermittently driving said conveyors and for intermittently rotating said disc, and common means for vertically adjusting said table with its supported disc and lower conveyor relative to the filling means to compensate for containers of varying size to be filled.

3. A machine for filling liquids into containers of varying size comprising, a frame, liquid filling means carried by said frame, a horizontal table movably supported by said frame and disposed below said filling means for receiving empty containers to be filled, a rotatable disc supported by said table for receiving containers therefrom, lifter elements supported by said table and bodily rotatable with said disc, said lifter elements having means for elevating the same relative to the disc, cooperating endless conveyors disposed in vertically spaced substantially horizontal planes above said table for advancing said containers in spaced relation on said table toward said disc and filling means, one of said conveyors being fixed against vertical movement and another of said conveyors being supported by said table, means for driving said conveyors and for rotating said disc, and common means for vertically adjusting said table with its supported disc and conveyor relative to the filling means to compensate for containers for varying size to be filled, said adjusting means comprising a lever pivoted to said frame and engaging said table, and spaced means on said frame and table respectively for removably locking the table in vertically adjusted position.

RONALD E. J. NORDQUIST.